Patented May 24, 1932

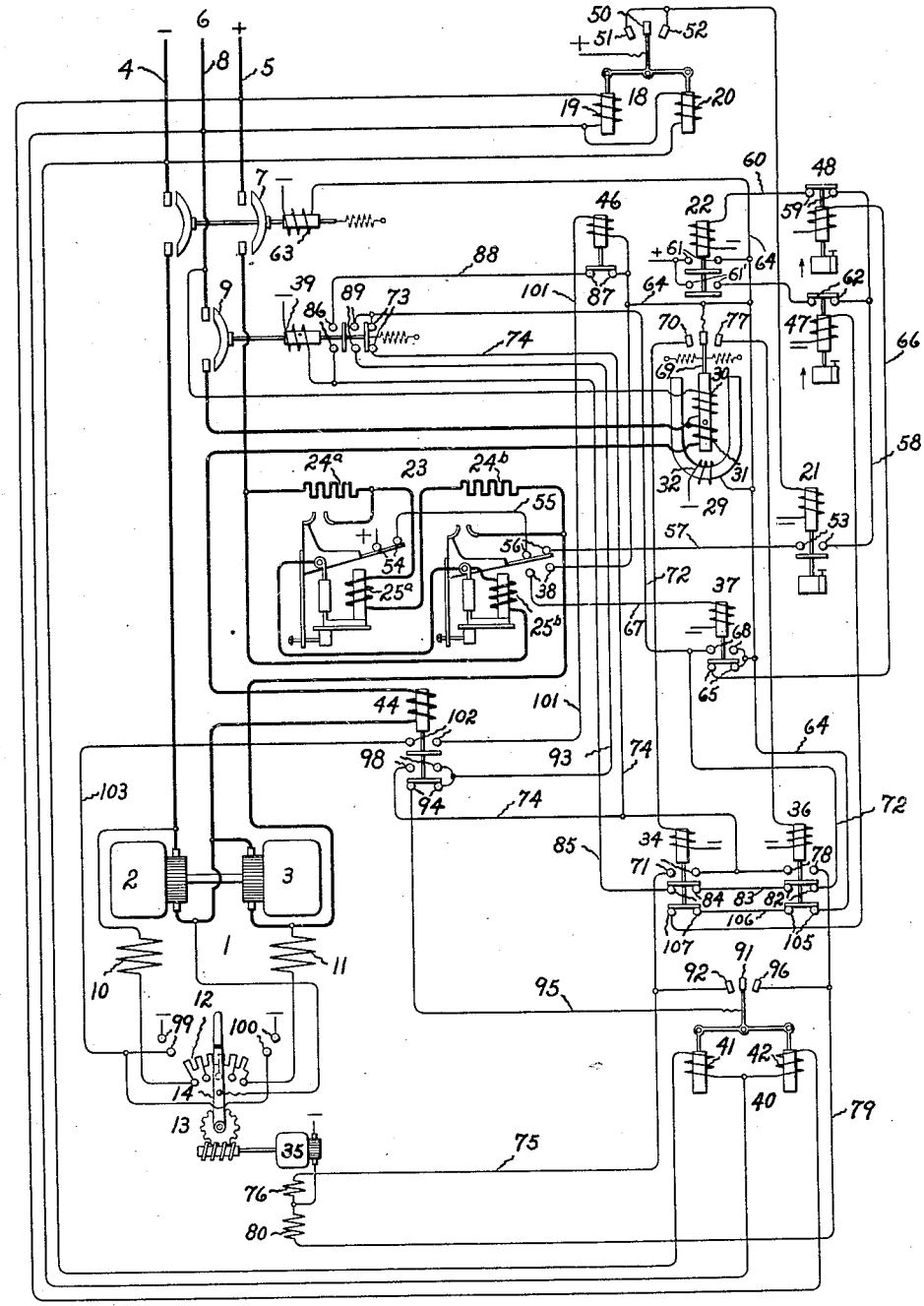

1,860,167

UNITED STATES PATENT OFFICE

HERMAN BANY AND HAROLD T. SEELEY, OF YEADON, PENNSYLVANIA, ASSIGNORS TO GENERAL ELECTRIC COMPANY, A CORPORATION OF NEW YORK

AUTOMATIC SWITCHING ARRANGEMENT

Application filed May 10, 1929. Serial No. 362,034.

Our invention relates to automatic switching arrangements and its object is to provide an improved arrangement for automatically starting a three-wire balancer set and connecting it to a three-wire direct current distribution system.

Our invention will be better understood from the following description when taken in connection with the accompanying drawing which shows diagrammatically a three-wire balancer set control arrangement embodying our invention and its scope will be pointed out in the appended claims.

Referring to the drawing, 1 represents a three-wire balancer set comprising two direct current machines 2 and 3 which have their rotors mechanically connected together. The armature windings of the two machines 2 and 3 are connected in series with the main terminals of the balancer set 1 and are arranged to be connected across the main conductors 4 and 5 of a three-wire circuit 6 of a three-wire direct current distribution system by means of a suitable switch 7. The neutral of the balancer set 1 is arranged to be connected to the neutral conductor 8 of the circuit 6 by means of a suitable switch 9. The machines 2 and 3 are provided with the field windings 10 and 11 respectively which are permanently connected, in series with the resistor 12 of a motor operated rheostat 13, across the main terminals of the balancer set 1, the resistor 12 being connected between the two field windings 10 and 11 in the series circuit. The movable contact 14 of the motor operated rheostat 13 is connected to the neutral of the balancer set 1 so that as the movable contact 14 is moved it varies the excitations of both of the machines simultaneously but inversely with respect to each other.

For effecting the starting of the balancer set 1, we provide a voltage balance relay 18 comprising two opposing coils 19 and 20 which are respectively responsive to the voltages between the neutral conductor 8 and two main conductors 5 and 4 of the circuit 6. When the circuit voltages are unbalanced, the relay 18 is arranged to complete an energizing circuit for a time relay 21 which, when energized for a predetermined length of time, is arranged to effect the energization of a master relay 22 if the balancer set 1 is in an operative condition to be started.

The energization of the master relay 22 effects the closing of the switch 7 and the operation of a suitable automatic starting arrangement 23, examples of which are well known in the art, whereby the main terminals of the balancer set 1 and a plurality of starting resistors 24a and 24b are connected in series across the main conductors 4 and 5 of the circuit 6 to start the set 1 and as the starting current decreases the starting resistors 24a and 24b are succcessively short circuited.

After the automatic starting means 23 has completed its operation, the rheostat 13 is adjusted automatically to equalize the voltages of the neutrals of the balancer set 1 and the circuit 6 and when these voltages are equal the closing of the neutral switch 9 is then effected.

As shown in the drawing, we accomplish these results by providing a directional relay 29 which has two operating coils 30 and 31 respectively connected in shunt and in series with the main terminals of the neutral switch 9 and a magnetizing winding 32 which is energized from any suitable source of direct current having a predetermined polarity. When the neutral switch 9 is open, the relay voltages of the neutrals of the balancer set 1 and the circuit 6 and when the neutral switch 9 is closed so that the operating winding 30 of the relay 29 is short-circuited, the relay operates in response to the direction of the current flowing through the neutral switch 9. When the neutral switch 9 is open and the neutral voltage of the circuit 6 exceeds the neutral voltage of the balancer set 1, the relay 29 is arranged to complete an energizing circuit for a control relay 34 which when energized completes a circuit for the driving motor 35 of the rheostat 13 so that the movable contact 14 of the rheostat is moved in a direction to increase the excitation of the machine 2 and to decrease the excitation of the machine 3. When the neutral voltage of the circuit 6 is less than the neutral voltage of the balancer set 1 and the neutral switch 9 is open, the relay 29 is arranged to complete an energizing circuit for the control relay 36 which when energized completes a circuit for the driving motor 35 so that the movable contact 14 of the rheostat 13 is moved in a direction to decrease the excitation of the machine 2 and to increase the excitation of the machine 3.

In order to prevent the rheostat 13 from being operated during the starting operation of the balancer set 1 the circuits of the motor 35 are controlled by a relay 37 so that the motor circuits cannot be completed by the control relays 34 and 36 until after the last starting resistor 24b has been short-circuited by its associated short-circuiting switch 25b. As shown in the drawing, the circuit of the relay 37 is arranged to be completed by auxiliary contacts 38 on the switch 25b when it is closed.

In order to effect the closing of the neutral switch 9 after the neutral voltage of the balancer set 1 has been regulated so that it is equal to the neutral voltage of the circuit 6 the control relays 34 and 36, when simultaneously deenergized while the control relay 37 is energized, are arranged to complete an energizing circuit for the closing coil 39 of the neutral switch 9.

In order to maintain the voltages of the circuit 6 balanced after the neutral switch 9 is closed the control of the rheostat 13 is arranged to be transferred by the closing of the switch 9 from the directional relay 29 to a voltage balance relay 40 comprising two opposing coils 41 and 42 which are respectively responsive to the voltages between the neutral conductor 8 and the main conductors 4 and 5 of the circuit 6. When the voltage between the conductors 4 and 8 exceeds the voltage between the conductors 5 and 8 the relay 40 is arranged to complete a circuit for the driving motor 35 of the rheostat 13 so that the movable contact 14 of the rheostat is moved in a direction to increase the excitation of the machine 3 and to decrease the excitation of the machine 2 and when the voltage between the conductors 4 and 8 is less than the voltage between the conductors 5 and 8 the relay 40 is arranged to complete a circuit for the driving motor 35 so that the movable contatc 14 is moved in a direction to decrease the excitation of the machine 3 and to increase the excitation of the machine 2.

In order to limit the output of the balancer set 1 under abnormal conditions on the circuit 6 we provide a current responsive relay 44 which is connected so that it is responsive to the current flowing through the neutral switch 9 when it is closed. When the current through the neutral switch 9 exceeds a predetermined value the current relay 44 operates to remove the control of the rheostat 13 from the voltage balance relay 40 and operates to control the rheostat 13 in conjunction with the directional relay 29 so as to limit the current through the neutral switch 9 to a predetermined value. In case the voltage unbalance on the circuit 6 is such that the balancer set 1 cannot correct it, we provide a relay 46 which is connected and arranged so that whenever the current through the neutral switch 9 exceeds a predetermined value and the movable contact 14 of the rheostat 13 is in either of its end positions, the relay 46 is energized and effects the opening of the neutral switch 9.

The shutting down of the balancer set 1 is arranged to be effected in response to the amount of current flowing through the neutral switch 9. We accomplish this result by arranging the control relays 34 and 36 so that when they are simultaneously deenergized they complete an energizing circuit for a time relay 47 which controls contacts in the energizing circuit of the master relay 22. Therefore, when the load connected to the circuit 6 is substantially balanced so that the current flowing through the neutral switch remains below a predetermined value and therefore the directional relay 29 is in its mid position, the time relay 47 is energized and, after a predetermined time, effects the deenergization of the master relay 22. The time setting of the relay 47 is relatively long so that the relay does not open its contacts during the starting operation of the set 1.

We also provide a suitable timing relay 48 of the well known lockout type for effecting the shutting down of the balancer set 1 in case the starting operation thereof is not completed within a predetermined time. As shown, the relay 48 is arranged to be energized in response to the energization of the master relay 22 and to be deenergized in response to the energization of the control relay 37 after the last resistor short-circuiting switch 25b closes. The time setting of the relay 48 is such that normally sufficient time does not elapse between the energization of the master relay 22 and the subsequent energization of the control relay 37 to allow the relay 48 to open its contacts which are in the energizing circuit of the master relay 22. If, however, the starting operation is not completed within a predetermined time after the master relay 22 is energized, the lockout relay 48 opens its contacts and deenergizes the master relay 22 so that the balancer set 1 is shut down and locked out until the lockout relay 48 is reset. Preferably, the relay 48 is arranged in any suitable manner so that it has to be reset manually.

The operation of the arrangement shown in the drawing, is as follows:

When the balancer set 1 is shut down and the voltages of the circuit 6 become unbalanced the movable contact 50 of the voltage balance relay 18 engages either the contact 51 or the contact 52 of the relay, depending upon which voltage of the circuit 6 is greater, and thereby completes an energizing circuit for the time relay 21. After a predetermined time the relay 21 closes its contacts 53 and completes an energizing circuit for the master relay 22. This circuit is from one side of a suitable control circuit, through auxiliary contacts 54 on the resistor short-circuiting switch 25a, conductor 55, auxiliary contacts 56 on the resistor short-circuiting switch 25b, conductor 57, contacts 53 of time relay 21, conductor 58, contacts 59 of time relay 48, conductor 60, winding of master relay 22 to the other side of the control circuit. Master relay 22 by closing its contacts 61' completes, through the contacts 62 of the time relay 47, a locking circuit for itself which is independent of the contacts 54, 56 and 53 so that the master relay 22 is not deenergized by the subsequent closing of the switches 25a and 25b and the subsequent deenergization of the time relay 21.

The closing of the contacts 61 of the master relay 22 completes an energizing circuit for the winding of the lockout relay 48 so that this relay starts to time. This circuit also includes the conductor 64, contacts 65 of the control relay 37 and the conductor 66.

The closing of the contacts 61 of the master relay 22 also completes an energizing circuit for the closing coil 63 of the switch 7 so that the machines 2 and 3 and the starting resistors 24a, 24b and the winding of the switch 25a of the automatic starting means 23 are connected in series across the main conductors 4 and 5 of the circuit 6 to start the balancer set 1.

As the balancer set 1 accelerates and the starting current thereof decreases the automatic switches 25a and 25b of the automatic switching means 23 operate in a manner well known in the art to short-circuit the starting resistors 24a and 24b successively. When the operation of the automatic starting means 23 is completed by the closing of the switch 25b, the auxiliary contacts 38 on the switch 25b complete an energizing circuit for the control relay 37. This circuit is from one side of the control circuit through contact 61 of the master relay 22, conductor 64, contacts 38 on the switch 25b, conductor 67, winding of control relay 37 to the other side of the control circuit. Control relay 37 by opening its contacts 65 opens the heretofore traced circuit for the lockout relay 48 so that this relay is deenergized and therefore stops timing. The relay 37 by closing its contacts 68 places the driving motor 35 of the rheostat 13 under the control of the directional relay 29.

If the voltage of the neutral conductor 8 of the circuit 6 is greater than the voltage of the neutral of the balancer set 1 after the starting operation has been completed, the movable contact 69 of the directional relay 29 engages the stationary contact 70 of the relay and completes through the contacts 61 of the master relay 22 an energizing circuit for the control relay 34. The control relay 34 by closing its contacts 71 completes an energizing circuit for the motor 35 so that the movable contact 14 is moved in a direction to increase the excitation of the machine 2 and decrease the excitation of the machine 3. This energizing circuit is from one side of the control circuit through contacts 61 of the master relay 22, conductor 64, contacts 68 of control relay 37, conductor 72, auxiliary contacts 73 on neutral switch 9, conductor 74, contacts 71 of control relay 34, conductor 75, field winding 76 and armature winding of motor 35 to the other side of the control circuit.

If the neutral voltage of the balancer set 1 is greater than the voltage of the neutral conductor 8 of the circuit 6 the movable contact 69 of the directional relay 29 is in engagement with the stationary contact 77 of the relay and thereby completes through the contacts 61 of the master relay 22 an energizing circuit for the control relay 36. The control relay 36 by closing its contacts 78 completes an energizing circuit for the driving motor 35 of the rheostat 13 so that the movable contact 14 is moved in a direction to decrease the excitation of the machine 2 and increase the excitation of the machine 3. This energizing circuit is from one side of the control circuit through contacts 61 of master relay 22, conductor 64, contacts 68 of control relay 37, conductor 72, auxiliary contacts 73 on neutral switch 9, conductor 74, contacts 78 of control relay 36, conductor 79, field winding 80 and armature winding of motor 35 to the other side of the control circuit.

When the rheostat 13 has been adjusted to the proper position to make the neutral voltage of the balancer set 1 the same as the voltage of the neutral conductor 8 of the circuit 6, the directional relay 29 occupies its mid position in which position the circuits of both of the control relays 34 and 36 are open. When both of the control relays 34 and 36 are simultaneously deenergized and the control relay 37 is energized, an energizing circuit is completed for the closing coil 39 of the neutral switch 9 to connect the neutral of the balancer set 1 to the neutral conductor 8 of the circuit 6. This energizing circuit is from one side of the control circuit through contacts 61 of the master relay 22, conductor 64, contacts 68 of control relay 37, conductor 72, contacts 82 of control relay 36, conductor 83, contacts 84 of control relay 34, conductor 85, closing coil 39 of the neutral switch 9 to the other side of the control circuit. The neutral switch 9 by closing its auxiliary contacts 86 completes a locking circuit for its closing coil 39 which is independent of the contacts 82 and 84 of the control relays 36 and 34 respectively so that the neutral switch 9 remains closed when these control relays are subsequently energized to control the operation of the rheostat 13. This holding circuit is from one side of the control circuit through contacts 61 of the master relay 22, conductor 64, contacts 87 of relay 46, conductor 88, auxiliary contacts 86 on switch 9, conductor 85, closing coil 39 to the other side of the control circuit.

The neutral switch 9 by opening its auxiliary contacts 73 and closing its auxiliary contacts 89 transfers the control of the motor operated rheostat 13 from the directional relay 29 to the voltage balance relay 40. If the voltage between conductors 5 and 8 is greater than the voltage between conductors 4 and 8 of the circuit 6 after the neutral switch 9 is closed, the movable contact 91 of the voltage balance relay 40 engages the stationary contact 92 and completes a circuit for the driving motor 35 of the rheostat 13 so that its movable contact 14 is moved in a direction to increase the excitation of the machine 2 and decrease the excitation of the machine 3. This energizing circuit is from one side of the control through contacts 61 of the master relay 22, conductor 64, contacts 68 of control relay 37, conductor 72, auxiliary contacts 89 on neutral switch 9, conductor 93, contacts 94 of current relay 44, conductor 95, contacts 91 and 92 of relay 40, conductor 75, field winding 76 and armature winding of the driving motor 35 to the other side of the control circuit. When the voltage between conductors 4 and 8 exceeds the voltage between conductors 5 and 8 of the circuit 6, the movable contacts 91 of the voltage balance relay 40 is in engagement with the stationary contact 96 and completes the circuit for the motor 35 of the rheostat 13 so that its arm 14 is moved in a direction to decrease the excitation of the machine 2 and increase the excitation of the machine 3. This energizing circuit is from one side of the control circuit through contacts 61 of the master relay 22, conductor 64, contacts 68 of control relay 37, conductor 72, auxiliary contacts 89 on neutral switch 9, conductor 93, contacts 94 of current responsive relay 44, conductor 95, contacts 91 and 96 of the voltage balance relay 40, conductor 79, field winding 80 and armature winding of motor 35 to the other side of the control circuit. Therefore, after the neutral switch 9 closes the voltage balance relay 40 controls the excitation of the balancer set 1 so as to maintain the voltages of the circuit 6 balanced.

If the conditions on the circuit 6 are such that the current flowing through the neutral switch 9 exceeds a predetermined value, the current responsive relay 44 opens its contacts 94 so as to remove the control of the rheostat 13 from the voltage balance relay 40 and by closing its contacts 98 completes in conjunction with the directional relay 29 the proper circuit for the motor 35 to move the contact 14 of the rheostat 13 in the proper direction to decrease the current through the neutral switch 9. If the abnormal current is flowing from the balancer set 1 to the neutral conductor 8, the movable contact 69 of the directional relay 29 is in engagement with the stationary contact 77 so that the heretofore described energizing circuit for the control relay 36 is completed. Therefore, when the current relay 44 closes its contacts 98, a circuit is completed for the motor 35 so that the movable contact 14 of the rheostat 13 is moved in a direction to decrease the excitation of the machine 2 and increase the excitation of the machine 3. The circuit for the motor 35 is from one side of the control circut through contacts 61 of the master relay 22, conductor 64, contacts 68 of control relay 37, conductor 72 auxiliary contacts 89 on neutral switch 9, conductor 93, contacts 98 of current relay 44, conductor 74, contacts 78 of control relay 36, conductor 79, field winding 80 and armature winding of motor 35 to the other side of the control circuit.

When the abnormal current through the neutral switch 9 flows from the neutral conductor 8 to the neutral of the balancer set 1, the movable contact 69 of the directional relay 29 is in engagement with the stationary contact 70 so that the heretofore described energizing circuit for the control relay 34 is completed. Therefore, when the current relay 44 closes its contacts 98 under these conditions, a circuit is completed for the motor 35 so that the movable contacts 14 of the rheostat 13 is moved in a direction to increase the excitation of the machine 2 and decrease the excitation of the machine 3. This circuit of the motor 35 is from one side of the control circuit through contacts 61 of the master relay 22, conductor 64, contacts 68 of control relay 37, conductor 72, auxiliary contacts 89 on neutral switch 9, conductor 93, contacts 98 of current relay 44, conductor 74, contacts 71 of control relay 34, conductor 75, field winding 76 and armature winding of motor 35 to the other side of the control circuit.

The current relay 45, therefore, operates to limit the current flowing through the neutral switch 9 to a predetermined value. In case the load conditions on the circuit 6 are such that the balancer set 9 cannot balance the voltages, the rheostat 13 is provided with the limit switches 99 and 100 which are closed when the movable contact 14 is in its respective end positions. The closing of either of these limit switches, when the current through the neutral switch 9 exceeds a predetermined value so that the contacts 102 of the current relay 44 are closed, completes an energizing circuit for the control relay 46. This circuit is from one side of the control circuit through the contacts 61 of the master relay 22, conductor 64, winding of relay 46, conductor 101, contacts 102 of current relay 44, conductor 103 to the other side of the control circuit through either the limit switch 99 or the limit switch 100. The relay 46 by opening its contacts 87 interrupts the heretofore described holding circuit for the closing winding 39 of the neutral switch 9 and effects the opening of the neutral switch 9. The neutral switch 9 then can be reclosed in the manner above described when the voltage of the neutral of the balancer set 1 is subsequently made equal to the voltages of the neutral conductor 8 of the circuit 6.

As long as the current flowing through the neutral switch 9 is above a predetermined value the movable contact 69 of the directional relay 29 will be in engagement with either the stationary contact 70 or the stationary contact 77 so that either the control relay 34 or the control relay 36 will be energized. When, however, the neutral current decreases below a predetermined value the movable contact 69 is held in its mid position so that both of the control relays 34 and 36 are deenergized and a circuit is completed for the time relay 47. This circuit is from one side of the control circuit through the contact 61 of the master relay 22, conductor 64, contacts 105 of control relay 36, conductor 106, contacts 107 of control relay 34, conductor 108, winding of time relay 47 to the other side of the control circuit. If the neutral current remains below a predetermined value for a predetermined time the time relay 47 opens its contacts 62 in the heretofore described circuit for the master relay 22. The master relay 22 by opening its contacts 61 effects the shutting down of the balancer set 1 by opening the heretofore described circuits for the closing coils 63 and 39 of the switches 7 and 9 respectively.

While we have, in accordance with the patent statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is,—

1. In combination, a three wire direct current circuit, a balancer set, means for connecting the main terminals of said set to the main conductors of said circuit, means controlled by said connecting means for regulating the excitation of said set in response to the difference between the neutral voltages of said set and circuit, and means controlled by the neutral voltages of said set and circuit for effecting the connection of the neutral of said set to the neutral of the circuit.

2. In combination, a three wire direct current circuit, a balancer set, means for connecting the main terminals of said set to the main conductors of said circuit, regulating means responsive to the relative neutral voltages of said set and circuit for controlling the excitation of said set so as to equalize said voltages, means controlled by said connecting means for rendering said regulating means operative after said connecting means has effected the connection of the main terminals of said set to the main conductors of said circuit, and means responsive to a predetermined relation between the neutral voltages of said circuit and set for effecting the connection of the neutral of said set to the neutral of said system.

3. In combination, a three wire direct current circuit, a balancer set connected to the main conductors of said circuit, regulating means for controlling the excitation of said set, control means responsive to the difference between the neutral voltages of said set and circuit for controlling said regulating means, control means responsive to the difference between the voltages between the neutral and the main conductors of said circuit, means for connecting the neutral of said set to the neutral of said circuit, and means controlled by said last mentioned connecting means for transferring the control of said regulating means from said first mentioned control means to the other of said control means.

4. In combination, a three wire direct current circuit, a balancer set connected to the main conductors of said circuit, regulating means for controlling the excitation of said set, control means responsive to the difference between the voltages between the neutral voltages of said set and circuit for controlling said regulating means, control means responsive to the difference between the voltages between the neutral and main conductors of said circuit, and means controlled by said first mentioned control means for effecting the connection of the neutral of said set to the neutral of said circuit and the transfer of the control of said regulating means from said first mentioned control means to the other of said control means when a predetermined relation exists between the neutral voltages of said set.

5. In combination, a three wire direct current circuit, a balancer set connected to the main conductors of said circuit, regulating means for controlling the excitation of said set, a voltage directional relay having a winding connected between the neutrals of said set and circuit for controlling the operation of said regulating means, a voltage balance relay having two opposing windings respectively energized in response to the voltages between the neutral and the main conductors of said circuit, and means responsive to a predetermined relation between the neutral voltages of said set and circuit for effecting the connection of the neutral of said set to the neutral of said circuit and for transferring the control of said regulating means from said directional relay to said balance relay.

6. In combination, a three wire direct current circuit, a balancer set connected to the three conductors of said circuit; regulating means for controlling the excitation of said set, means responsive to the current in the neutral circuit of said set for controlling said regulating means, means controlled by said regulating means for effecting the disconnection of the neutral of said set from the neutral conductor of said circuit, and means responsive to the relative voltages of the neutrals of said set and circuit for effecting the subsequent connection of the neutral of said set to the neutral of said circuit.

7. In combination, a three wire direct current circuit, a balancer set connected to the three conductors of said circuit, an adjustable rheostat in the field circuit of said set, means responsive to a predetermined electric condition of said set for controlling said rheostat, means associated with said rheostat for effecting the disconnection of the neutral of said set from the neutral conductor of said circuit when said rheostat is in a predetermined position, and means responsive to a predetermined relation between the voltages of the neutrals of said set and circuit when said neutrals are disconnected for effecting the connection thereof.

8. In combination, a three wire direct current circuit, a balancer set connected to the three conductors of said circuit, an adjustable rheostat in the field circuit of said set, means responsive to a predetermined electric condition of said set for controlling said rheostat, means associated with said rheostat for effecting the disconnection of the neutral of said set from the neutral conductor of said circuit when said rheostat is in a predetermined position, and means responsive to a predetermined relation between the voltages of the neutrals of said set and circuit when said neutrals are disconnected for controlling said rheostat to equalize the voltages of said neutrals and to effect the reconnection thereof when the voltages are equal.

9. In combination, a three wire direct current circuit, a balancer set connected to the three conductors of said circuit, regulating means for controlling the excitation of said set, means controlled in accordance with predetermined electrical conditions of said set for effecting the disconnection of the neutral of said set from the neutral conductor of said circuit, and means dependent upon the neutral voltage of said set for reconnecting the neutrals of said set and circuit.

10. In combination, a three wire direct current circuit, a balancer set connected to the main conductors of said circuit, and means dependent upon the neutral voltage of said set for connecting it to the neutral conductor of said circuit.

11. In combination, a three wire direct current circuit, a balancer set connected to the main conductors of said circuit, and means dependent upon the relative neutral voltages of said set and circuit for connecting the neutrals of said set and circuit together.

12. In combination, a three wire direct current circuit, a balancer set connected to the three conductors of said circuit, regulating means for controlling the excitation of said set, and means for controlling said regulating means in response to a certain electrical characteristic of said circuit under predetermined conditions thereof and in response to another electrical characteristic under other predetermined conditions thereof.

13. In combination, a three wire direct current circuit, a balancer set connected to the three conductors of said circuit, regulating means for controlling the excitation of said set, and means for controlling said regulating means to maintain balanced voltage conditions on said circuit when the neutral current of said set is below a predetermined value and for maintaining the neutral current below said predetermined value when the unbalance conditions are such as to cause a neutral current in excess of said predetermined value.

14. In combination, an electric circuit, a balancer set connected thereto, regulating means for controlling the excitation of said set, and means controlled by the position of said regulating means and the neutral current of said set for effecting the disconnection of said set from said circuit.

15. In combination, a three wire direct current circuit, a balancer set connected thereto, an adjustable rheostat in the field circuit of said set, means responsive to the current through the neutral of said set, and means controlled by said rheostat and current responsive means for effecting the disconnection of said set from said circuit when the neutral current exceeds a predetermined value and said rheostat is in a predetermined position.

In witness whereof, we have hereunto set our hands this 11th day of April, 1929.

HERMAN BANY.
HAROLD T. SEELEY.